United States Patent [19]

Miyata et al.

[11] Patent Number: 5,044,842
[45] Date of Patent: Sep. 3, 1991

[54] ROUND SCREW THREAD MACHINING METHOD

[75] Inventors: Mitsuto Miyata; Teruyuki Matsumura, both of Tokyo; Masashi Kawasumi, Yamanashi, all of Japan

[73] Assignee: Fanuc, Ltd., Yamanashi, Japan

[21] Appl. No.: 432,771

[22] PCT Filed: Mar. 3, 1989

[86] PCT No.: PCT/JP89/00227
§ 371 Date: Nov. 6, 1989
§ 102(e) Date: Nov. 6, 1989

[87] PCT Pub. No.: WO89/08521
PCT Pub. Date: Sep. 21, 1989

[30] Foreign Application Priority Data

Mar. 10, 1988 [JP]  Japan .................... 63-56927

[51] Int. Cl.$^5$ ............................ B23C 3/32; B23B 1/00
[52] U.S. Cl. ........................................ 409/66; 82/1.11; 82/118; 364/474.33
[58] Field of Search .................... 409/66, 69; 82/1.11, 82/110, 118; 364/474.33; 318/569, 571, 572

[56] References Cited

U.S. PATENT DOCUMENTS 3,854,353 12/1974 Cutler ................................... 82/1.11
4,173,786 11/1979 Kuhnell et al. ................... 82/118 X

FOREIGN PATENT DOCUMENTS 263618 12/1985 Japan ..................................... 82/110
263619 12/1985 Japan ..................................... 82/110

Primary Examiner—William Briggs
Attorney, Agent, or Firm—Staas & Halsey

[57] ABSTRACT

When round screw thread machining is performed with a tool (TL) having a radius smaller than a circular arc radius of a threaded portion (RST), data necessary for deciding (i) tool path patterns of round screw threading cycles (PLi) and (ii) a starting point (Pi) of each round screw threading cycle are commanded and incorporated in NC command data of the round screw threading cycles, the cycle starting point (Pi) of each round screw threading cycle (PLi) is obtained along the circular arc profile of the round screw thread using the data, and round screw thread machining is performed by repeatedly executing the threading cycles while successively shifting the cycle starting point.

2 Claims, 6 Drawing Sheets

ROUND SCREW THREAD MACHINING METHOD

BACKGROUND OF THE INVENTION

1. Field of the Invention

This invention relates to a method of machining a round screw thread and, more particularly, to a round screw thread machining method for machining a round screw thread with a tool the radius of which is smaller than the arc radius of the threaded portion.

2. Description of the Related Art

There are cases in which a round screw thread whose threaded portion has the shape of a circular arc (see FIG. 4) is machined using an NC lathe. In such cases, a tool (a button tool) is designated, an NC program which specifies the tool path for moving the tool along the profile of the round screw thread is created and the round screw thread is cut using this NC program.

In creating such an NC program for machining a round screw thread, the first step is to create the following NC statement, which uses a G-code (G92) of a threading cycle, as a subprogram:

G92UuWwIiFf;

where "U" is a word address for commanding a tool relief quantity u/2 (incremental) along the X axis at the thread end point, "W" is a word address for commanding screw length w (incremental), "I" is a word address for commanding a taper amount i of the tapered screw, this indicating a straight screw when the taper amount is 0 (i=0), and F is a word address for designating lead. In accordance with these threading cycle NC data, in a case where the threading cycle starting position (cycle starting point) is a point A (FIG. 5), a tool path pattern is specified for cutting the round screw thread at the designated lead f by moving the tool from point to point in the manner A→B→C→D and then returning the tool to point A.

In a case where the radius r of a round screw thread portion RST (FIG. 5) is greater than the tool diameter of a button tool TL, the circular arc of the round screw thread must be machined by dividing the machining into a number of separate runs. That is, machining must be performed by finding offset partitioning points Pi' (i=1, 2 . . .) which offset, by an amount corresponding to the tool diameter, points on the circular arc of the round screw thread portion RST which divide the arc into a predetermined number of arcs, then finding threading cycle starting points Pi (i = 1, 2 . . .) corresponding to these offset partitioning points Pi', and moving the tool to each of the cycle starting points Pi, followed by calling the subprogram for that threading cycle. In other words, with regard to the cycle starting point P1, an NC statement is created in such a manner that the round screw thread having the designated lead f is cut by moving the tool TL from point to point in the manner

P1→P1'→P1''→P1''', by positioning NC data for moving the tool to point P1 and a subprogram call instruction, after which the tool is returned to point P1. Similarly, with regard to the cycle starting point P2, an NC statement is created in such a manner that the tool TL is shifted from point P1 to point P2, after which it is moved from point to point in the manner

P2→P2'→P2''→P2''' by a command for positioning at point P2 and a subprogram call instruction. Thus, cycle starting points Pi are successively designated and a threading cycle subprogram call command is assigned whenever such a designation is made, thereby creating the NC program.

Figure 6:
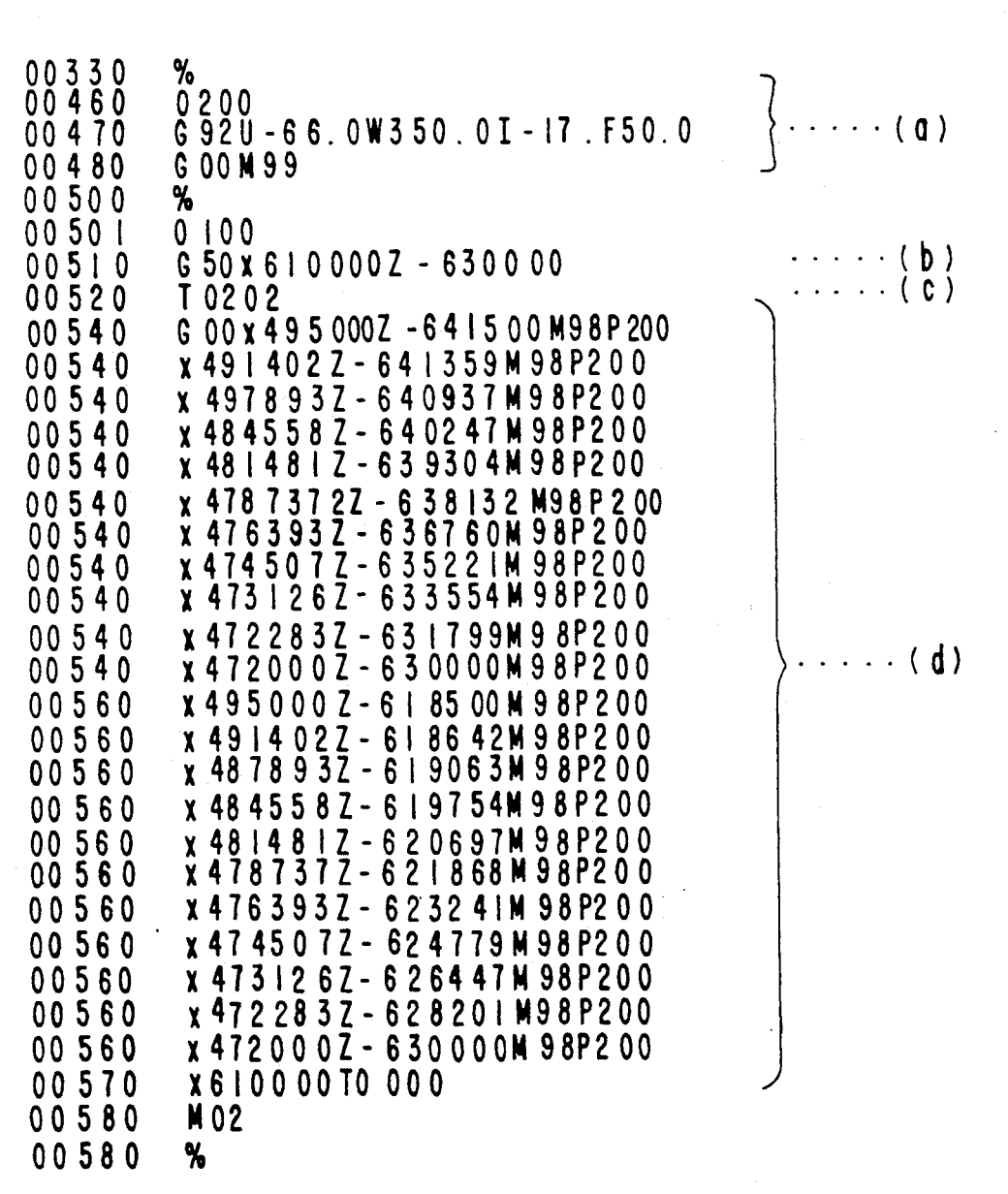

FIG. 6 is an example of an NC program for a case in which the radius of the round screw thread portion fabricated by such a method is larger than the tool diameter In FIG. 6, (a) signifies a subprogram "0200" for a threading cycle having a screw length of "350", a taper amount of "17", and a lead of "50"; (b) is NC data for setting coordinates, (c) signifies machining with a tool whose tool number is "202" (this is a tool selection instruction), and (d) signifies an NC statement for moving the tool to the threading cycle starting point indicated by "X_Z_", and executing the threading cycle from this cycle starting point by the subprogram "0200" called by a subprogram call command "M98P200".

In accordance with the conventional round screw thread machining method, the circumference of the round screw thread is partitioned into a predetermined number of arcs, all of the cycle starting points for the threading cycles corresponding to respective ones of the partitioning points are calculated at the desk, the cycle starting points calculated are successively designated, and a threading cycle subprogram call command using the G92 command is assigned to each cycle starting point, thereby creating the NC program.

With the conventional method, however, the operation for calculating the cycle starting points requires a great deal of time and calculation errors are easily made. In addition, the arrangement is such that each threading cycle subprogram using the G92 command is created in advance, after which the subprogram is called upon designating the cycle starting point. As a result, the NC statements are large in quantity, as shown in (d) of FIG. 5, so that the operation for creating the NC statements requires a large amount of time.

Accordingly, an object of the present invention is to provide a round screw thread machining method in which cycle starting points need not be calculated at the desk in a case where the radius of the round screw thread portion is greater than the tool diameter, thus making it possible to simply create NC statements for the threading cycles of a round screw thread.

SUMMARY OF THE INVENTION

The round screw thread machining method of the present invention includes, when performing round screw thread machining with a tool having a radius smaller than a circular arc radius of a threaded portion, a step of commanding data necessary for deciding (i) tool path patterns of round screw threading cycles and (ii) a starting point of each round screw threading cycle, which data are incorporated in NC command data of the round screw threading cycles, a step of obtaining the starting point of each round screw threading cycle along the circular arc profile of the round screw thread using the data, and a step of performing round screw thread machining by repeatedly executing the threading cycles while successively shifting the cycle starting point along the circular arc profile.

In accordance with this round screw thread machining method, the starting point of each threading cycle

BRIEF DESCRIPTION OF THE DRAWINGS

FIG. 6 shows an example of a conventional NC program for round screw thread machining.

DETAILED DESCRIPTION OF THE PREFERRED EMBODIMENTS

Figure 1:
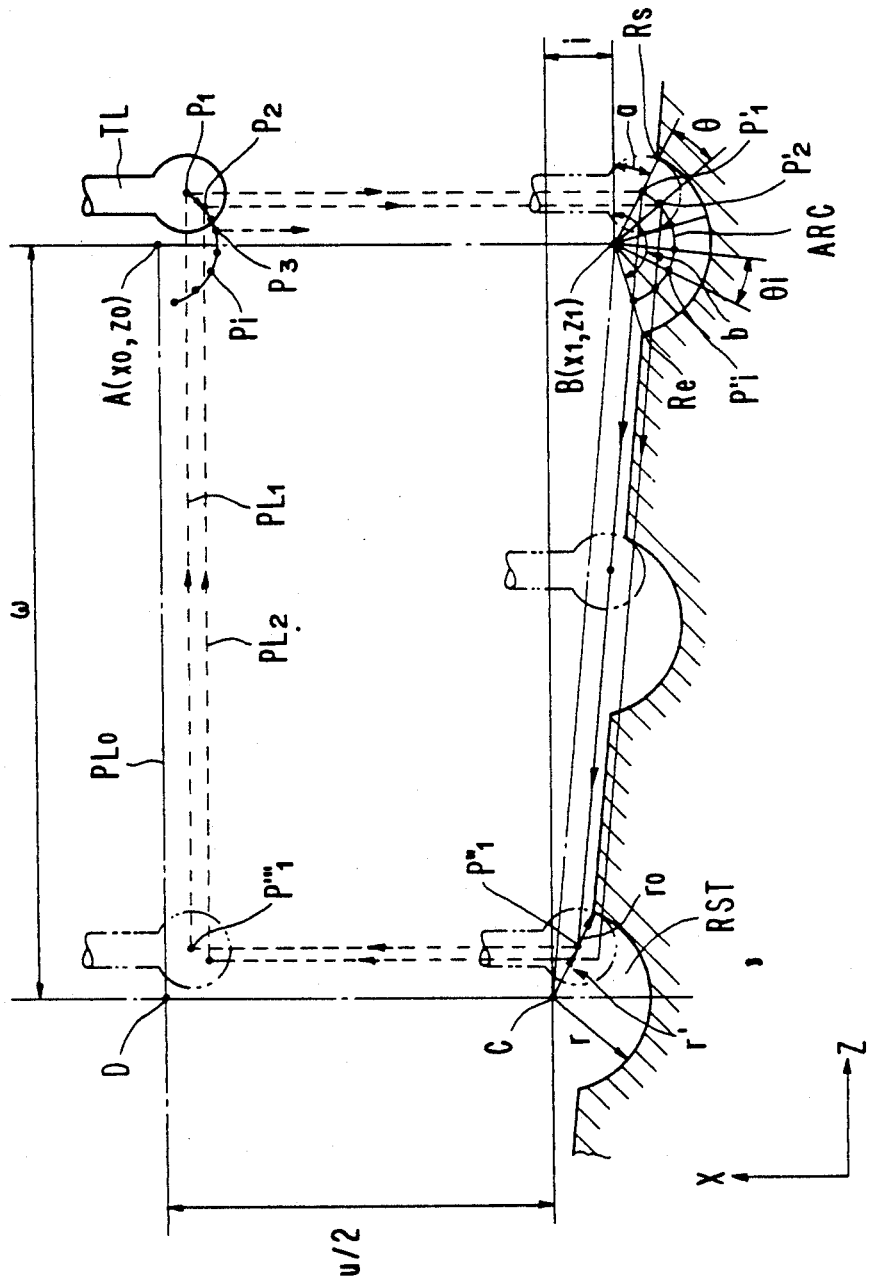
FIG. 1 is a schematic view for describing the general features of round screw thread machining according to the present invention.

FIG. 1 is a view for describing the general features of round screw thread machining according to the present invention, in which TL represents a tool for round screw thread machining, RST a round screw thread portion, Pi the cycle starting point of an i-th threading cycle, Pi' a cut-in point, and PLi a tool path of the i-th threading cycle.

When round screw thread machining is performed with the tool TL having a radius smaller than the circular arc radius r of a thread portion RST, data necessary for deciding the tool paths PLi (i=1, 2, 3 ...) of the round screw threading cycles and the cycle starting point Pi of each round screw threading cycle are commanded, these data are incorporated in NC command data of the round screw threading cycles. The starting point Pi of each round screw threading cycle along the circular arc profile of the round screw thread is obtained using the data, and round screw thread machining is performed by repeatedly executing the threading cycles while successively shifting the cycle starting point along the circular arc profile in the manner P1→P2→P3→. . . .

Figure 2:
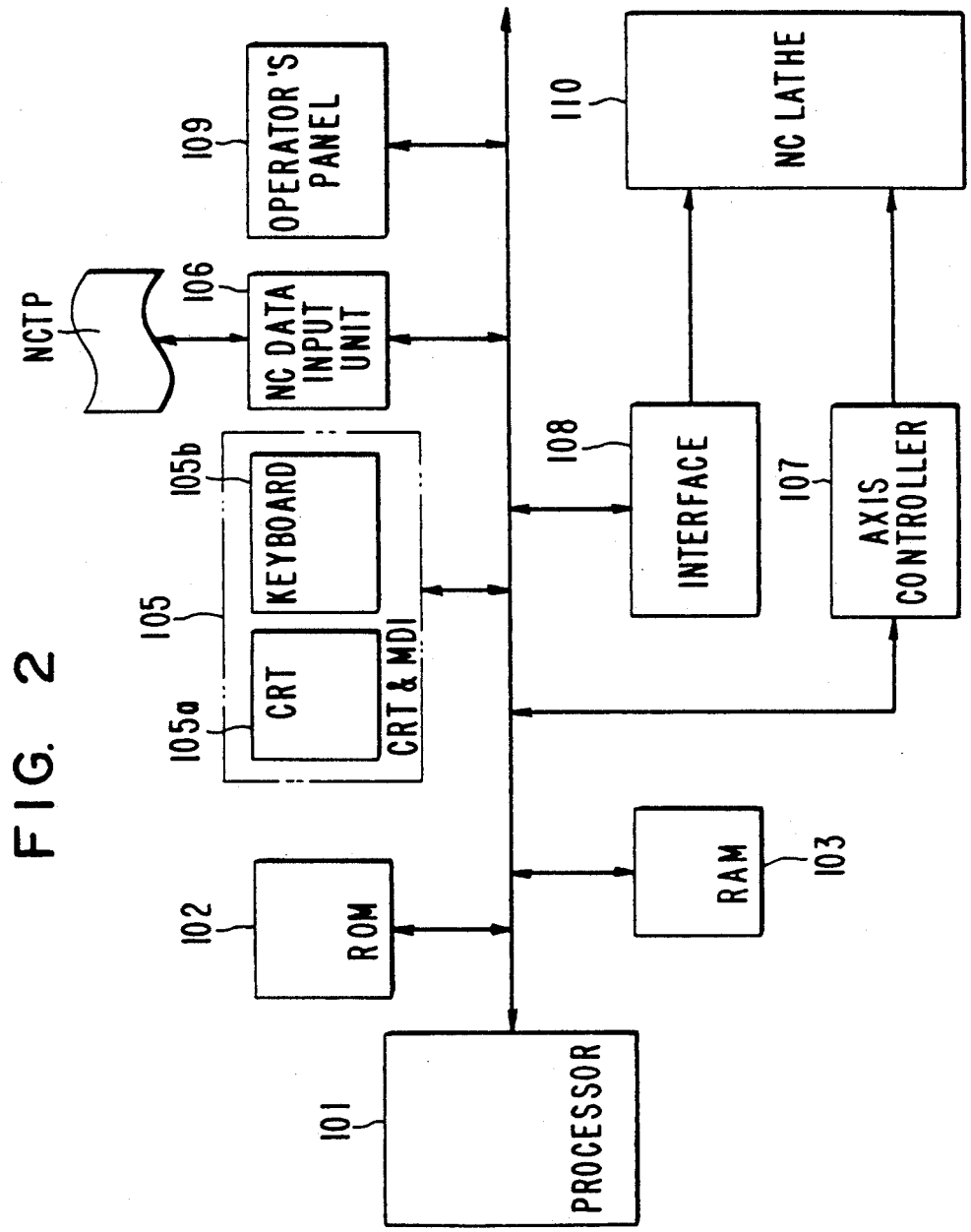
FIG. 2 is a block diagram of an NC apparatus equipped with an automatic programming function for practicing the present invention.

FIG. 2 is a block diagram of an NC apparatus equipped with an automatic programming function for practicing the present invention.

Numeral 101 denotes a processor, 102 a program memory (ROM) for storing the control programs (for NC control and automatic programming), 103 a RAM for storing the results of processing as well as the NC program or the like being executed, and 105 a CRT/MDI unit having a CRT 105a and a keyboard 105b.

Numeral 106 denotes an NC data input unit for inputting NC data from an NC tape NCTP, 107 an axis controller having a pulse interpolator and a servo unit for each axis, 108 an input interface for outputting auxiliary function instructions and the like, which are issued by the processor 101, to a machine tool (an NC lathe), and for inputting various signals from the NC lathe, 109 an operator's panel, and 110 an NC lathe.

The following NC statements for round screw threading are stored on the NC tape NCTP:

$$G00 \ Xx_oZz_o; \quad (i)$$

$$T\square\square; \quad (ii)$$

$$G\square\square U\underline{u}W\underline{w}IiRrAaBbDdFf; \quad (iii)$$

In the foregoing, $(x_o,z_o)$ in (i) are the coordinates of point A (FIG. 1), (ii) represents a tool selection instruction, and (iii) represents NC command data specifying data needed to decide the tool path pattern (A→B→C→D→A) of a round screw threading cycle as well as the cycle starting point Pi (cut-in point Pi') of each round screw threading cycle PLi. In the NC command data of this round screw threading cycle, "G□□" is a G-code, e.g., G92, for designating the round screw threading cycle. "U" is a word address for commanding a tool relief quantity u/2 (incremental) along the X axis at the thread end point, "W" is a word address for commanding screw length w (incremental), and "I" is a word address for commanding a taper amount i of a tapered screw, this indicating a straight screw when the taper amount is 0 (i=0). "R" is a word address for designating the circular arc radius of the round screw thread portion RST, "A" is a word address for designating an angle a, in the clockwise direction, defined by the Z axis and a straight line connecting the center of the arc of the round screw thread portion RST and the starting point Rs of the round screw thread portion RST, "B" is a word address for designating an angle b, in the clockwise direction, defined by the Z axis and a straight line similarly connecting the center of the arc and the end point Re of the round screw thread portion RST, "D" is a word address for designating the number of partitions of the circular arc of the round screw thread portion RST, and "F" is a word address for designating lead. The radius $r_o$ of the tool selected by the tool selection instruction (ii) is already known.

Figure 3:
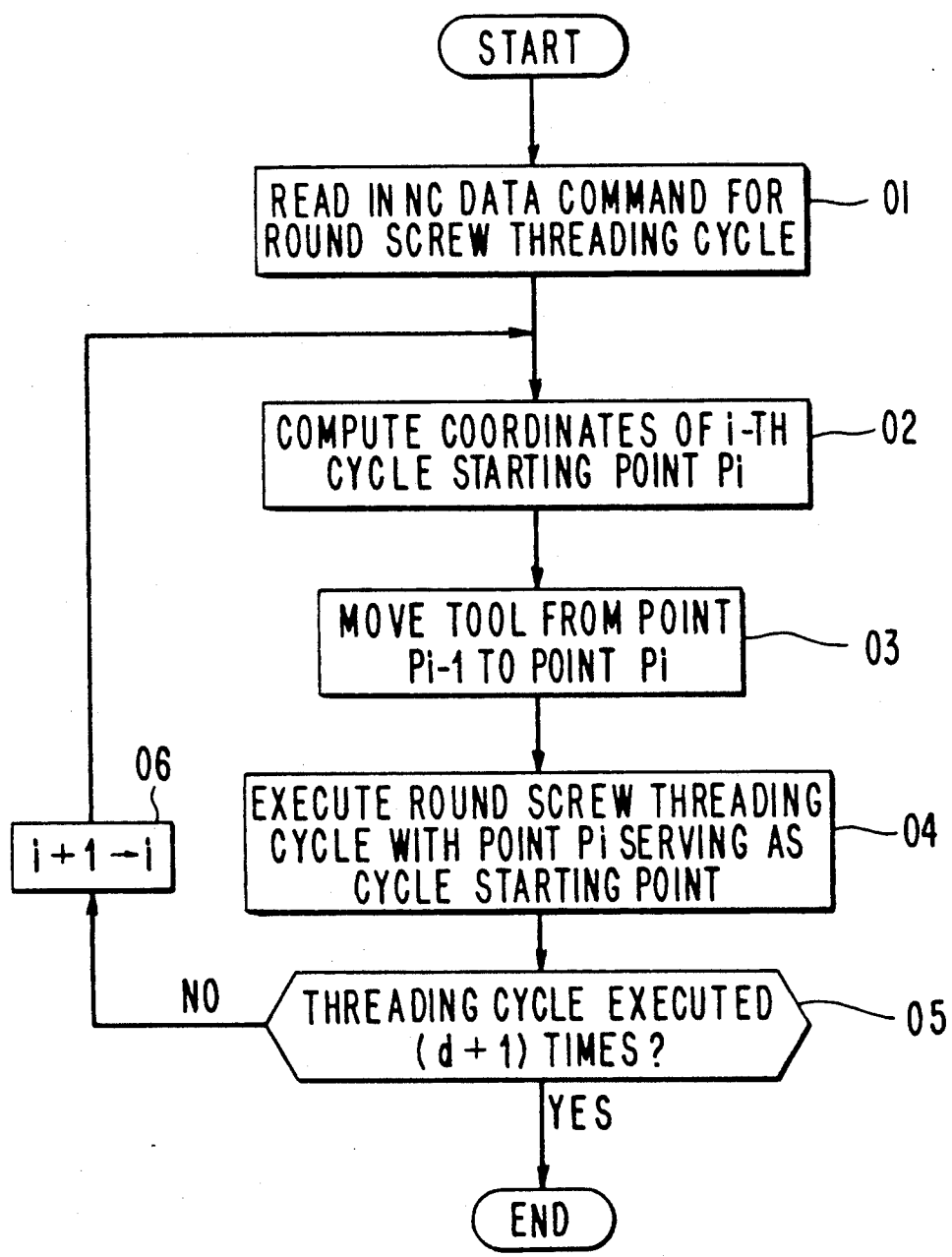
FIG. 3 is a flowchart of processing according to the present invention.
Figure 4:
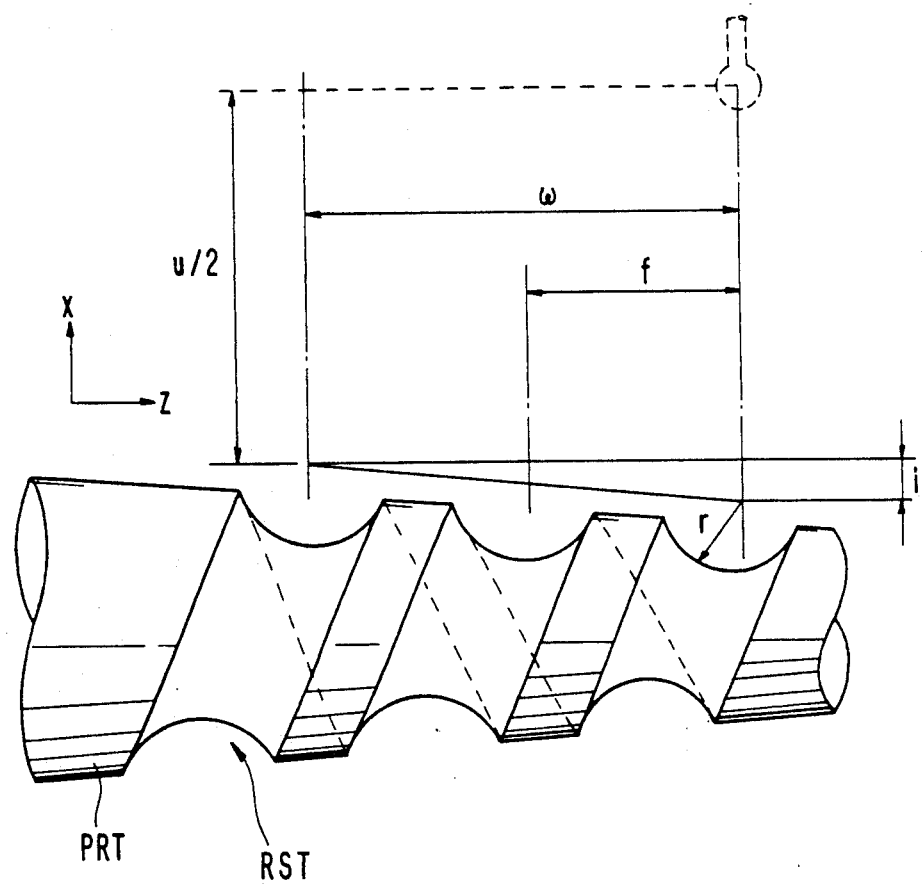
FIG. 4 is a view for describing a round screw thread.
Figure 5:
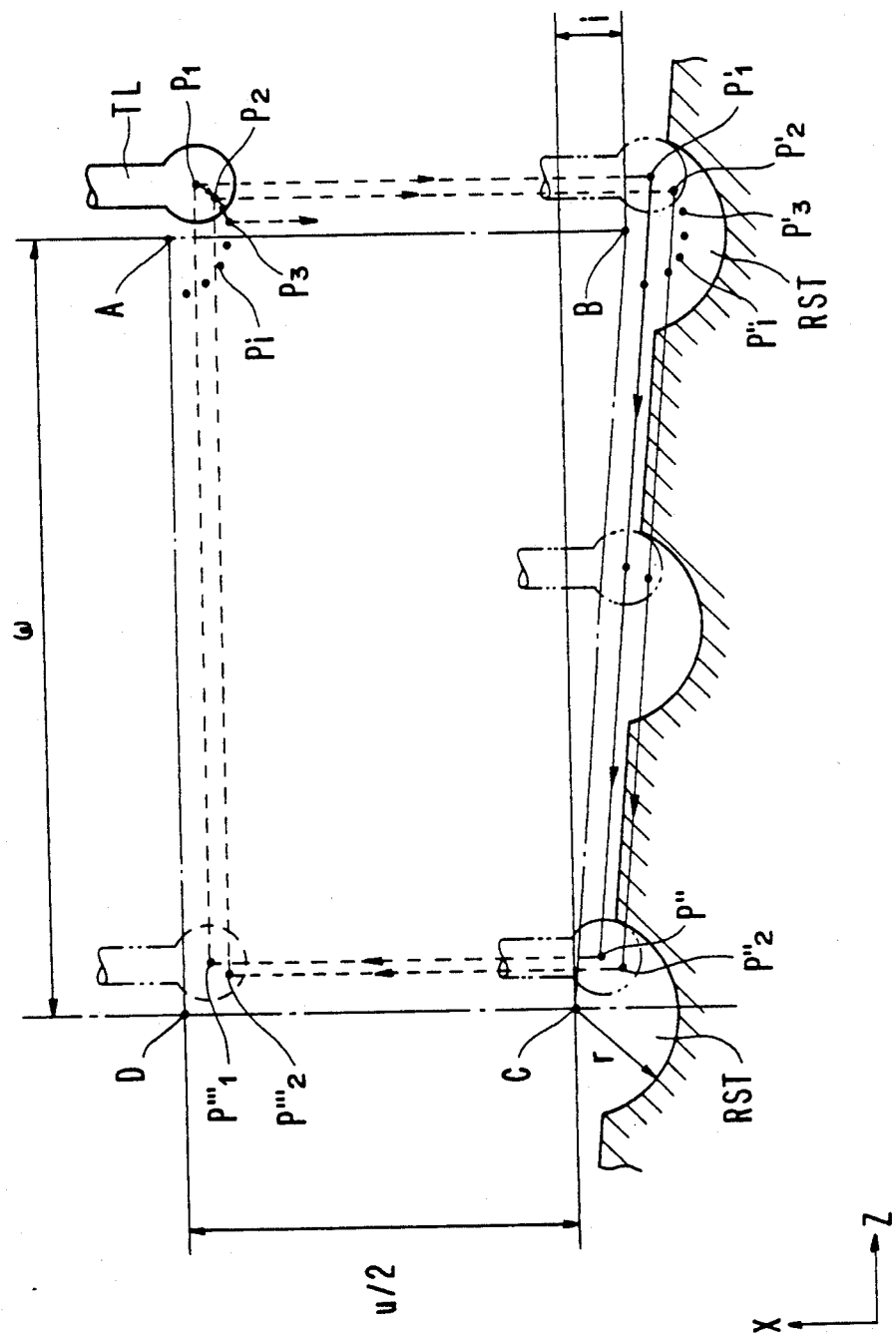
FIG. 5 is a view for describing a conventional round screw thread machining method.

The round screw thread machining method of the present invention will now be described in accordance with the flowchart of FIG. 3 for a case where round screw thread machining is performed by a tool TL having a radius $r_o$ smaller than the arc radius r of the round screw thread RST (FIG. 1).

After the tool is positioned at point A by NC data for moving the tool to the point A $(x_o,y_o)$, the following NC data of the round screw threading cycle is read in (step 201):

$$G\square\square UuWwIiRrAaBbDdFf;$$

When this is done, the processor 101 obtains the coordinates $(x_i,z_i)$ of the cycle starting point Pi of the i-th (the initial value of i is 1) round screw threading cycle PLi, with the cycle starting point A $(x_o,y_o)$ serving as a reference (step 202). The processor 101 obtains the radius r' of an offset circular arc ARC in accordance with the equation $$r' = r - r_o$$

using the radius r of screw thread portion and the tool diameter $r_o$, then obtains a partitioning angle $\theta$ in accordance with the equation $$\theta = (b-a)/d$$

using the number of partitions d and the angles a, b, obtains an angle Ai of the i-th partitioning position in accordance with the equation $$\Theta i = a + (i-1)\cdot\theta$$

and computes the coordinates of the cycle starting point $P_i$ ($i = 1, 2 \ldots$) of the i-th round screw threading cycle $PL_i$ ($i = 1, 2 \ldots$), using the i-th angle $A_i$ and the radius $r'$ of the offset arc, in accordance with the equations $$X = x_o - r' \sin(\Theta i)$$

$$Z = z_o + r' \cos(\Theta i)$$

When the coordinates of the cycle starting point $P_i$ ($i = 1, 2 \ldots$) of the tool path $PL_i$ of the i-th round screw threading cycle are obtained, the processor 101 causes the tool to move from point $P_{i-1}$ (where $P_0$ coincides with point A) to point $P_i$ (step 203), then executes the i-th round screw threading cycle with the point $P_i$ being used as the cycle starting point and moves the tool along the tool path $PL_i$ (step 204).

When the i-th round screw threading cycle is completed, a check is performed to determine if the number of times the round screw threading cycle has been executed has attained the value $(d+1)$ (step 205). If the cycle has not been executed $(d+1)$ times, the operation $i+1 \rightarrow i$ is performed (step 206), after which processing from step 202 onward is repeated. As a result, round screw threading cycles are repeatedly executed while the cycle starting point $P_i$ (cut-in starting point $P_i'$) is shifted successively along the arc profile of the round screw thread portion RST.

If the number of times the round screw threading cycle has been executed is found to have attained the value $(d+1)$ at the decision of step 205, then round screw thread machining is completed.

The foregoing is for a case where the NC command data for round screw threading are given beforehand given by the NC tape. However, an arrangement can be adopted in which the data necessary for creating the NC commands for round screw threading, e.g., the coordinates of the starting and end points of the round screw thread, the radius of the round screw thread, the number of partitions of the arc profile of the round screw thread, lead, and the angles a, b, are specified, the NC command data for round screw threading are created by automatic programming, and these data are applied to an NC controller to perform round screw threading.

In accordance with the present invention, the arrangement is such that when round screw thread machining is performed with a tool having a radius smaller than a circular arc radius of a threaded portion, data necessary for deciding (i) tool path patterns of round screw threading cycles and (ii) a starting point of each round screw threading cycle are commanded and incorporated in NC command data of the round screw threading cycles, the starting point of each round screw threading cycle is obtained along the circular arc profile of the round screw thread using the data, and round screw thread machining is performed by repeatedly executing the threading cycles while successively shifting the cycle starting point. As a result, cycle starting points need not be calculated at the desk in a case where the radius of the round screw thread portion is greater than the tool diameter, thus making it possible to simply create NC statements for the threading cycles of a round screw thread. In addition, Nc tape length can be reduced. This makes it possible to reduce the amount of memory needed to store the NC statements.

We claim:

1. A round screw thread machining method in which a round screw thread has a threaded portion which is arcuate in shape, for performing round screw thread machining with a tool having a radius smaller than a circular arc radius of the threaded portion, comprising the steps of:
   (a) commanding data necessary for deciding (i) tool path patterns of round screw threading cycles and (ii) a starting point of each round screw threading cycle, which data are incorporated in NC command data of the round screw threading cycles;
   (b) obtaining the starting point of each round screw threading cycle along the circular arc profile of the round screw thread using the data; and
   (c) performing round screw thread machining by repeatedly executing the threading cycles while successively shifting the cycle starting point along the actuate profile,
   wherein the data necessary for deciding the starting point of the round screw threading cycle are an arc radius r of the round screw thread, angles a, b which center lines passing through respective arc starting and end points of the round screw thread make with horizontal axes, and a number d of partitions of the arc, and wherein steps (a) and (b) include
   obtaining a partitioning angle $\theta$ in accordance with the equation $$\theta = (b-a)/d$$

using the number of partitions d and the angles a, b;
   obtaining an angle $A_i$ of an i-th partitioning position in accordance with the equation $$\Theta i = a + (i-1) \cdot \theta$$

and
   computing coordinates (X,Y) of a cycle starting point of an i-th round screw threading cycle, using coordinates $(x_o, y_o)$ of a tool path pattern starting point of the round screw threading cycle, the i-th angle $A_i$ and a difference $r'$ between the radius r of the threaded portion and tool diameter $r_o$, in accordance with the equations $$X = x_o - r' \sin(\Theta i)$$

$$Z = Z_o = r' \cos(\theta i)$$

2. A round screw thread machining method according to claim 1, further comprising creating NC command data indicative of the round screw threading cycles by specifying coordinates of starting and end points of the round screw thread, the radius of the round screw thread, the number of partitions of the arc profile of the round screw thread, and lead.

* * * * *